United States Patent [19]

Hirao

[11] Patent Number: 4,649,303
[45] Date of Patent: Mar. 10, 1987

[54] ROTOR FOR A SUPERCONDUCTING ROTATING ELECTRIC MACHINE

[75] Inventor: Toshiki Hirao, Kobe, Japan

[73] Assignee: Mitsubishi Denki Kabushiki Kaisha, Tokyo, Japan

[21] Appl. No.: 819,294

[22] Filed: Jan. 10, 1986

[30] Foreign Application Priority Data

Feb. 26, 1985 [JP] Japan .................. 60-39575

[51] Int. Cl.$^4$ .................. H02K 9/00; H02K 3/24
[52] U.S. Cl. .................. 310/52; 310/261
[58] Field of Search .................. 310/52, 54, 57, 65, 310/10, 40, 64

[56] References Cited

U.S. PATENT DOCUMENTS

| 4,227,102 | 10/1980 | Rozenfeld et al. | 310/52 |
| 4,282,451 | 8/1981 | Bratoljic | 310/64 |
| 4,430,589 | 2/1984 | Sakuyama et al. | 310/52 |
| 4,442,369 | 4/1984 | Okamoto et al. | 310/52 |
| 4,556,810 | 12/1985 | Kasper et al. | 310/261 |

FOREIGN PATENT DOCUMENTS

| 55-17299 | 2/1980 | Japan . | |
| 55-83439 | 6/1980 | Japan . | |
| 148929 | 6/1981 | Japan | 310/52 |
| 57-13961 | 1/1982 | Japan . | |

Primary Examiner—Patrick R. Salce
Assistant Examiner—D. L. Rebsch
Attorney, Agent, or Firm—Leydig, Voit & Mayer

[57] ABSTRACT

A rotor for a superconducting rotating electric machine of the type having a coil-carrying shaft including torque tubes connected to opposite ends thereof. A circumferentially-extending groove is formed in the coil-carrying shaft between one of the torque tubes and a recess in the coil-carrying shaft in which superconducting field coils are housed. The radially outer end of the groove opens into a space for liquid helium provided between the outer surface of the coil-carrying shaft and a helium-sealing outer tube. Heat entering the coil-carrying shaft and conducted in a path along the torque tubes is absorbed by the liquid helium within the groove and is prevented from reaching the superconducting field coils. The radially inner end of the groove can be sealed, or it can be connected to a central cavity of the coil-carrying shaft by one or more radially-extending holes through which liquid helium can flow for improving the circulation of helium through the coil-carrying shaft.

7 Claims, 5 Drawing Figures

ROTOR FOR A SUPERCONDUCTING ROTATING ELECTRIC MACHINE

BACKGROUND OF THE INVENTION

This invention relates to a rotor for a superconducting rotating electric machine.

A typical rotor of the type with which the present invention is concerned is illustrated in FIG. 1 in cross-sectional form. As shown in the figure, cylindrical torque tubes 1 are rigidly secured to opposite ends of a hollow, cylindrical coil-carrying shaft 2 on which superconducting field coils 3 are mounted. The right torque tube 1 in the figure is rigidly secured to a first end shaft 8, and the left torque tube 1 in the figure is rigidly secured to a second end shaft 9 which is drivingly connected to a prime mover or to a load, depending upon whether the rotor is to be used as part of a generator or a motor. The first end shaft 8 and the second end shaft 9 are both rotatably supported by bearings 10. The second end shaft 9 has a number of slip rings 11 mounted thereon via which field current is supplied to the field coils 3.

The coil-carrying shaft 2 is surrounded by a cylindrical warm damper shield 4 whose opposite ends are secured to the first end shaft 8 and the second end shaft 9. A cylindrical cold damper shield 5 is disposed between the warm damper shield 4 and the coil-carrying shaft 2 with a longitudinally-extending space therebetween. The warm damper shield 4 and the cold damper shield 5 shield the field coils 3 from high-frequency magnetic fields and decrease rotor oscillations due to disturbances in the electrical power system to which the rotor is connected. In addition, the warm damper shield 4 forms a vacuum seal between the inside and outside of the rotor, and the cold damper shield 5 acts as a radiation shield for the inside portions of the coil-carrying shaft 2 in which liquid helium is contained.

A helium outer tube 6 surrounds the coil-carrying shaft 2 with a space left between its outer surface and the inner surface of the cold damper shield 5. The ends of the coil-carrying shaft 2 are sealed by end plates 7, and the central cavity 15 of the coil-carrying shaft 2 is filled with liquid helium.

Heat exchangers 12 are either disposed on or formed as part of the torque tubes 1. At either end of the coil-carrying shaft 2, lateral radiation shields 13 are provided which protect the field coils 3 from lateral radiation. A vacuum is maintained in the spaces 14 between the warm damper shield 4 and the cold damper shield 5, between the cold damper shield 5 and the helium outer tube 6, and between the outer ends of the coil-carrying shaft 2 and the second end shaft 9 and the first end shaft 8.

In a typical rotor for a superconducting rotating electric machine of the illustrated type, liquid helium is introduced into the central cavity 15 of the coil-carrying shaft 2 through unillustrated pipes which pass through the second end shaft 9. The liquid helium cools the superconducting field coils 3 to cryogenic temperatures at which their electrical resistance is zero. As a result, there are no excitation losses, and a powerful magnetic field can be generated by the field coils 3 to generate alternating current electric power in an unillustrated stator. The direction of flow of the liquid helium through the rotor is indicated by the arrows.

FIG. 2 illustrates in greater detail the end portion of the coil-carrying shaft 2 of FIG. 1, showing the structure of a rotor disclosed in Japanese Laid-Open Patent Application No. 57-13961. The field coils 3 are housed in a longitudinally-extending recess 2a formed in the coil-carrying shaft 2 and are secured against centrifugal forces by a retaining ring 16 which is shrink fit over the coil-carrying shaft 2. A longitudinally-extending space 19 is left between the outer surface of the retaining ring 16 and the inner surface of the helium outer tube 6. This space 19 is filled with liquid helium.

The field coils 3 are separated from one another, from the sides of the recess 2a in which they are housed, and from the inner peripheral surface of the retaining ring 16 by electrically-insulating spacers 17. In addition to providing electrical insulation, the spacers 17 prevent the lateral movement of the coils 3.

A radially-extending hole 18 is formed between the central cavity 15 of the coil-carrying shaft 2 and the radially-inner surface of the recess 2a in which the field coils 3 are housed. This hole 18 is in fluid communication with unillustrated grooves which are formed in the spacers 17 so that liquid helium can flow from the central cavity 15 into the grooves in the spacers 17 through the hole 18, thereby cooling the coils 3.

The conventional structure shown in FIG. 2 has the drawback that it is possible for heat which is conducted along the torque tube 1 to flow into the coil-carrying shaft 2 and to reach the coils 3. The flow of this heat is illustrated by the arrows in the figure. Although some of this heat is absorbed by the liquid helium in the hole 18 and in the unillustrated grooves in the spacers 17, the amount of heat which reaches the coils 3 is still significant enough that it can lead to a breakdown in the superconductivity of the field coils 3. If such a breakdown in superconductivity occurs, it is necessary to stop the rotation of the rotor. When the rotor is employed in a generator, a loss of superconductivity is especially serious and can require the shutting down of an entire generating unit.

As a means for decreasing the amount of heat which reaches the field coils 3 by conduction along the ends of the coil-carrying shaft 2, it has been proposed to increase the number of radially-extending holes 18 between the central cavity 15 and the recess 2a of the coil-carrying shaft 2. However, the machining of a larger number of holes 18 requires a great deal of effort, and because of the location of the holes 18 with respect to the coils 3, their cooling efficiency is not necessarily good. Accordingly, increasing the number of holes 18 is not a satisfactory solution to the problem.

SUMMARY OF THE INVENTION

It is an object of the present invention to overcome the above-described problem and to provide a rotor for a superconducting rotating electric machine in which the amount of heat which reaches the field coils by conduction along the ends of the coil carrying shaft can be greatly reduced, thereby preventing a breakdown in superconductivity, and enabling stable operation.

It is another object of the present invention to provide a rotor for a superconducting rotating electric machine in which the circulation of liquid helium in the rotor is improved.

In a rotor according to the present invention, a circumferentially-extending groove is formed in a coil-carrying shaft between the portion of the coil-carrying shaft which is connected to a torque tube and a recess in the coil-carrying shaft in which superconducting field coils are housed. The radially outer end of the groove opens onto a space provided between the outer surface of the coil-carrying shaft and a helium outer tube, the space and the groove being filled with liquid helium. Conducted heat which enters the coil-carrying shaft from the torque tube is absorbed by the liquid helium within the groove and is prevented from reaching the superconducting field coils. The radially inner end of the groove can be sealed, or it can be connected to the central cavity of the coil-carrying shaft by one or more radially-extending holes through which liquid helium can flow, in which case the circulation of helium through the coil-carrying shaft is improved.

BRIEF DESCRIPTION OF THE DRAWINGS

In the drawings, the same reference numerals indicate the same or corresponding parts.

DESCRIPTION OF THE PREFERRED EMBODIMENTS

Figure 1:
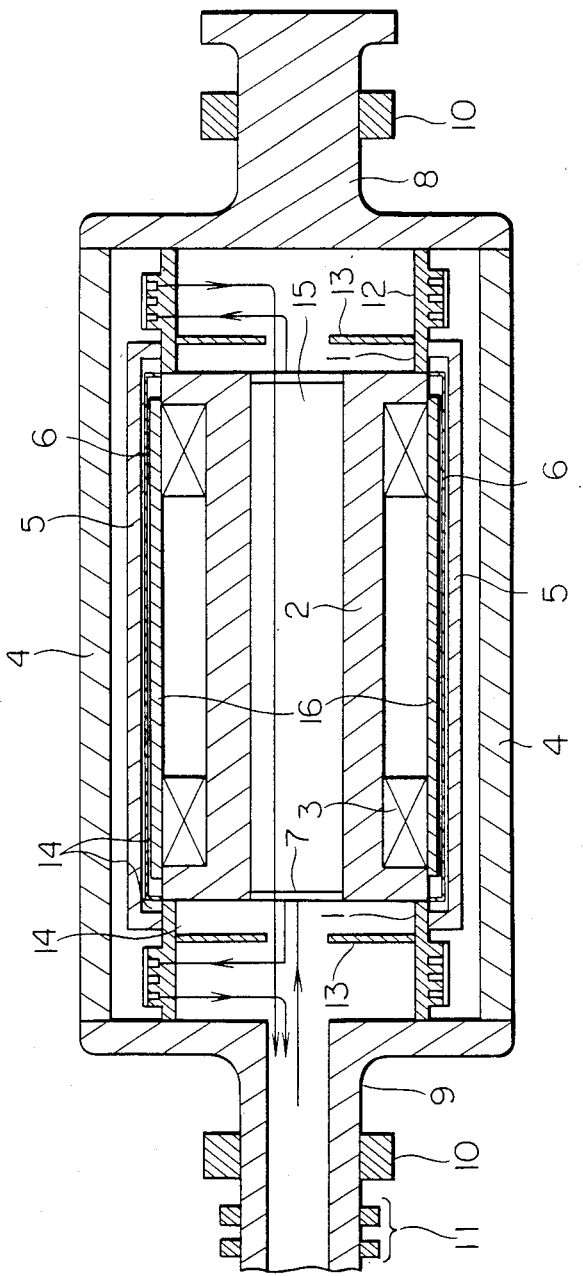
FIG. 1 is a longitudinal cross-sectional view of a rotor for a superconducting rotating machine of the type to which the present invention relates.
Figure 2:
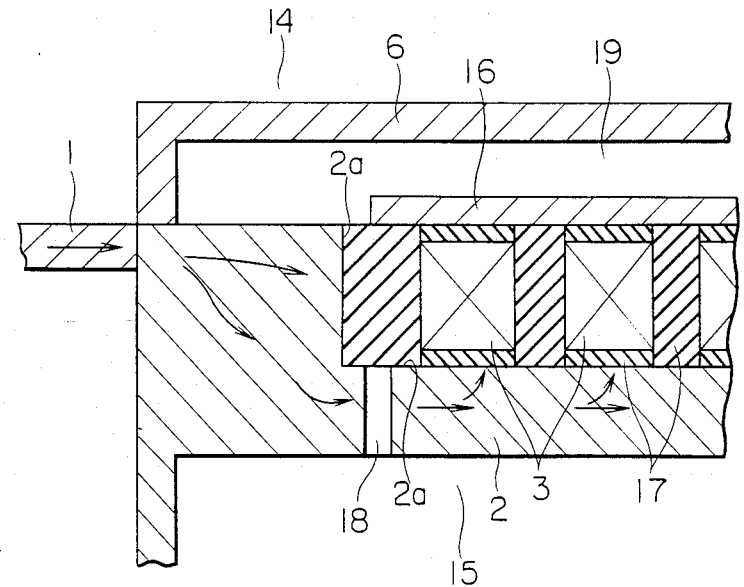
FIG. 2 is a longitudinal cross-sectional view showing the structure of the end portion of a conventional rotor of the type illustrated in FIG. 1.
Figure 3:
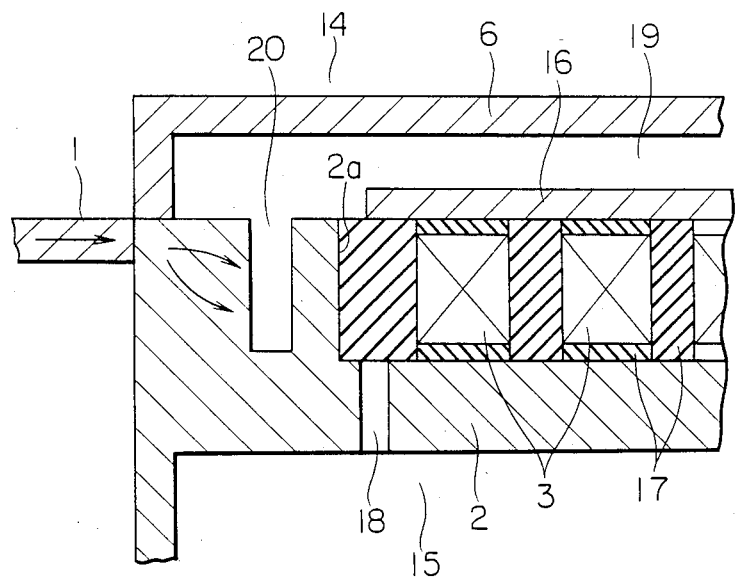
FIG. 3 is a longitudinal cross-sectional view of the end portion of a rotor according to a first embodiment of the present invention.

Hereinbelow, a number of preferred embodiments of the present invention will be described while referring to FIGS. 3 through 5 of the accompanying drawings. FIG. 3 is a longitudinal cross-sectionakl view of the end portion of a coil-carrying shaft of a first embodiment of a rotor according to the present invention. The overall structure of the unillustrated portions of this rotor is identical to that illustrated in FIG. 1, and therefore an explanation will be made only with respect to the portion illustrated in FIG. 3. Furthermore, the elements shown in FIG. 3 which bear the same reference numerals as elements shown in FIG. 2 have the same structure and purpose, and their explanation will be omitted. The end portion of this embodiment differs from the conventional one illustrated in FIG. 2 in that a circumferentially-extending groove 20 is formed near the end of the coil-carrying shaft 2 between the torque tube 1 and the recess 2a in which the superconducting field coils 3 are housed. The radially outer end of the groove 20 opens onto the space 19 between the outer surface of the coil-carrying shaft 2 and the helium outer tube 6, both the space 19 and the groove 20 being filled with liquid helium. The depth of the groove 20 should be substantially the same as the depth of the recess 2a. There is no minimum required width for the groove 20, and it can be the smallest width achievable by machining and still produce the desired effects.

Because of the provision of this groove 20, heat (indicated by the arrows in FIG. 3) which is conducted along the torque tube 1 and enters the end of the coil-carrying shaft 2 is unable to cross the groove 20 and is absorbed by the liquid helium which fills the groove 20. As a result, the superconducting field coils 3 are effectively shielded from this conducted heat and there is no fear of the heat producing a breakdown in superconductivity.

Figure 4:
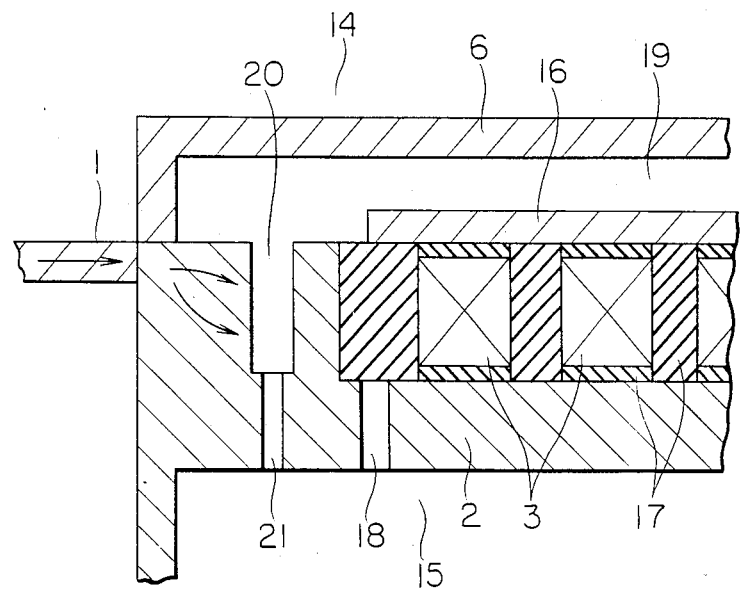
FIG. 4 is a longitudinal cross-sectional view of the end portion of a rotor according to a second embodiment of the present invention.

FIG. 4 illustrates a second embodiment of a rotor according to the present invention, which differs from the previous embodiment in the provision of one or more radially-extending through holes 21 which communicate between the radially inner end of the groove 20 and the central cavity 15 of the coil-carrying shaft 2. By the provision of these holes 21, a flow path having low flow resistance is provided for liquid helium to flow from the central cavity 15 to the space 19 through the holes 21 and the groove 20, and the cooling effect of the liquid helium is increased. The structure of this embodiment is otherwise identical to the rotor illustrated in FIG. 1.

Figure 5:
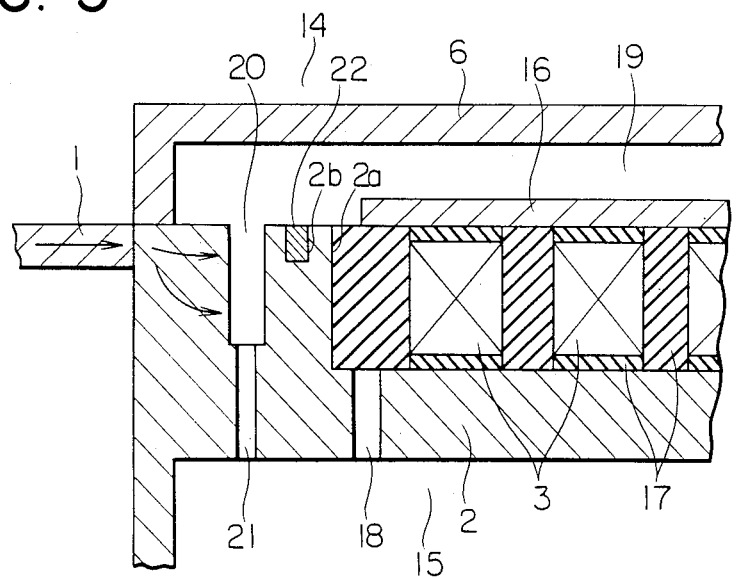
FIG. 5 is a longitudinal cross-sectional view of the end portion of a rotor according to a third embodiment of the present invention.

FIG. 5 illustrates the end portion of a third embodiment of a rotor according to the present invention. In this embodiment, an interpole crossover portion 22 of the superconducting field coils 3 is housed in a slot 2b formed in the coil-carrying shaft 2 between the torque tube 1 and the recess 2a for the field coils 3. The groove 20 and the radially-extending hole 21 are formed in the coil-carrying shaft 2 between the torque tube 1 and the interpole crossover portion 22 so as to also shield the crossover portion 22 from heat conducted along the torque tube 1. The structure of this embodiment is otherwise identical to that of the embodiment illustrated in FIG. 4.

It can be seen that because of the provision of a circumferentially-extending groove 20 filled with liquid helium, the superconducting field coils 3 are effectively shielded against heat which enters the coil-carrying shaft 2 by conduction along the torque tube 1, and that if a radially-extending through hole 21 is provided between the inner end of the groove 20 and the central cavity 15 in the coil-carrying shaft 2, the cooling effect of the liquid helium can be increased.

What is claimed is:

1. An improved rotor for a superconducting rotating electric machine of the type having a coil-carrying shaft with an outer peripheral surface comprising: torque tubes connected to opposite ends of said coil-carrying shaft, superconducting field coils housed in a recess provided in said coil-carrying shaft, a helium-sealing outer tube surrounding said coil-carrying shaft to form a sealed space for liquid helium between the outer surface of said coil-carrying shaft and an inner surface of said helium-sealing outer tube, and a circumferentially-extending groove provided on said coil-carrying shaft and extending inwardly from the outer peripheral surface to intersect a heat path along said shaft between the recess for said superconducting field coils and one of said torque tubes, the groove having an effect of substantially the same depth as the recess, to prevent heat conducted along said path from the one of said torque tubes from reaching said field coils, the radially outer end of said groove opening into said space to provide communication between liquid helium in the space and in said groove.

2. An improved rotor as claimed in claim 1, wherein the depth of said groove is substantially the same as the depth of said recess for said superconducting field coils.

3. An improved rotor as claimed in claim 1, wherein the width of said groove is the minimum width which can be achieved by machining.

4. An improved rotor for a superconducting rotating electric machine of the type having a coil-carrying shaft comprising: torque tubes connected to opposite ends of said coil-carrying shaft, superconducting field coils housed in a recess formed in said coil-carrying shaft, a helium-sealing outer tube surrounding said coil-carrying shaft to form a sealed space for liquid helium between the outer surface of said coil-carrying shaft and the inner surface of said helium-sealing outer tube, said coil-carrying shaft having a circumferentially-extending groove formed therein between the recess for said superconducting field coils and one of said torque tubes, a center cavity for liquid helium, and a radially-extending through-hole formed in said coil-carrying shaft between the cavity and the radially inner end of said groove, said radially outer end of said groove opening into the space for flow of liquid helium between the space, the cavity, and said groove, said groove having a depth substantially the same as the depth of the recess for said superconducting field coils.

5. Am improved rotor for a superconducting rotating electric machine of the type having a coil-carrying shaft comprising: torque tubes connected to opposite ends of said coil-carrying shaft, superconducting field coils housed in a recess formed in said coil-carrying shaft, a helium-sealing outer tube surrounding said coil-carrying shaft to form a sealed space for liquid helium between the outer surface of said coil-carrying shaft and the inner surface of said helium-sealing outer tube, said coil-carrying shaft having a circumferentially-extending groove formed therein between the recess for said superconducting field coils and one of said torque tubes, said superconducting field coils having an interpole crossover portion housed in said coil-carrying shaft between the recess and said groove, the radially outer end of said groove opening into the space for flow of liquid helium into said groove.

6. An improved rotor as claimed in claim 2, wherein said superconducting field coils have an interpole crossover portion which is housed in said coil-carrying shaft between said recess and said groove.

7. An improved rotor as claimed in claim 4, wherein said superconducting field coils have an interpole crossover portion which is housed in said coil-carrying shaft between said recess and said groove.

* * * * *